United States Patent [19]

Jansons et al.

[11] Patent Number: 4,698,393
[45] Date of Patent: Oct. 6, 1987

[54] PREPARATION OF POLY(ARYLENE ETHER KETONES)

[75] Inventors: Viktors Jansons, Los Gatos; Heinrich C. Gors, Mountain View; Stephen Moore, Redwood City; Robert H. Reamey, Menlo Park; Paul Becker, San Francisco, all of Calif.

[73] Assignee: Raychem Corporation, Menlo Park, Calif.

[21] Appl. No.: 922,781

[22] Filed: Oct. 23, 1986

Related U.S. Application Data

[63] Continuation of Ser. No. 790,029, Oct. 22, 1985, abandoned, which is a continuation-in-part of Ser. No. 762,011, Jul. 31, 1985, abandoned, which is a continuation of Ser. No. 648,119, Sep. 6, 1984, abandoned, which is a continuation-in-part of Ser. No. 594,503, Mar. 29, 1984, abandoned, which is a continuation-in-part of Ser. No. 481,083, Mar. 31, 1983, abandoned.

[51] Int. Cl.$^4$ ..................... C08F 4/00; C08F 293/00
[52] U.S. Cl. ..................... 525/242; 525/280; 525/309; 528/222; 528/223; 528/224; 528/225
[58] Field of Search ............. 525/242, 280, 309; 528/222, 223, 224, 225

[56] References Cited

U.S. PATENT DOCUMENTS

| | | | |
|---|---|---|---|
| 2,952,712 | 9/1960 | Roberts et al. | 524/467 X |
| 3,065,205 | 11/1962 | Bonner | 528/176 |
| 3,177,270 | 4/1965 | Jones et al. | 525/265 X |
| 3,385,825 | 5/1968 | Goodman et al. | 528/176 |
| 3,441,538 | 4/1969 | Marks | 528/176 |
| 3,442,857 | 5/1969 | Thornton | 528/176 |
| 3,516,966 | 6/1970 | Berr | 528/194 |
| 3,524,833 | 8/1970 | Darms | 528/176 |
| 3,767,620 | 11/1971 | Angelo et al. | 528/176 |
| 3,791,890 | 2/1974 | Gander | 528/176 |
| 3,953,400 | 4/1976 | Dahl | 528/206 |
| 3,956,240 | 5/1976 | Dahl et al. | 528/176 |
| 4,008,203 | 2/1977 | Jones | 528/175 |
| 4,028,435 | 6/1977 | Seki et al. | 525/309 X |
| 4,052,365 | 10/1977 | Jones | 528/206 |
| 4,104,331 | 8/1978 | Cunningham | 525/242 X |
| 4,229,564 | 10/1980 | Dahl | 528/220 X |
| 4,247,682 | 1/1981 | Dahl | 528/176 |
| 4,356,292 | 10/1982 | Sankaran et al. | 528/125 |
| 4,356,298 | 10/1982 | Marvel et al. | 528/125 |
| 4,358,565 | 11/1982 | Eckert | 525/280 |
| 4,361,693 | 11/1982 | Jansons | 528/86 |
| 4,396,755 | 8/1983 | Rose | 528/176 |
| 4,398,020 | 8/1983 | Rose | 528/207 |
| 4,461,874 | 7/1984 | Teyssie et al. | 525/271 |

FOREIGN PATENT DOCUMENTS

| | | |
|---|---|---|
| 45-18311 | 6/1970 | Japan . |
| 971227 | 9/1964 | United Kingdom . |
| 1019226 | 2/1966 | United Kingdom . |
| 1086021 | 10/1967 | United Kingdom . |
| 1250251 | 10/1971 | United Kingdom . |
| 1340709 | 12/1973 | United Kingdom . |
| 1383393 | 2/1975 | United Kingdom . |
| 1558615 | 1/1980 | United Kingdom . |

*Primary Examiner*—Lucille M. Phynes
*Attorney, Agent, or Firm*—Yuan Chao; Edith A. Rice; Herbert G. Burkard

[57] ABSTRACT

The preparation of poly(arylene ether ketones) by Friedel-Crafts polymerization, in the presence of a Lewis acid catalyst and a diluent, is conducted under conditions in which the polymer and/or its complex with the catalyst is suspended in the diluent during at least part of the polyreaction mixture if desired. The dispersant may be a polymer or an organic compound containing at least eight carbon atoms and is preferably a Lewis base. The dispersant preferably contains at least one molecular segment substantially compatible with the poly(arylene ether ketone) or its complex with the Lewis acid and substantially incompatible with the diluent and at least one molecular segment substantially compatible with the diluent and substantially incompatible with the poly(arylene ether ketone) or its complex with the Lewis acid.

20 Claims, No Drawings

PREPARATION OF POLY(ARYLENE ETHER KETONES)

REFERENCE TO RELATED APPLICATIONS

This application is a continuation of application Ser. No. 790,029, filed Oct. 22, 1985, abandoned which is a continuation-in-part of application Ser. No. 762,011 filed July 31, 1985, which is a continuation of application Ser. No. 648,119 filed Sept. 6, 1984, which is a continuation-in-part of application Ser. No. 594,503 filed Mar. 29, 1984, which is a continuation-in-part of application Ser. No. 481,083 filed Mar. 31, 1983, the disclosures of which are incorporated herein by reference, all abandoned.

BACKGROUND OF THE INVENTION

This invention relates to a method of preparing poly(arylene ether ketones) and in particular to an electrophilic dispersion polymerization process for preparing such polymers.

Poly(arylenes), in particular all para-linked poly(arylene ether ketones), possess many desirable properties, for example, high temperature stability, mechanical strength, and resistance towards common solvents. This invention is directed to an improved electrophilic synthesis for preparing poly(arylenes), in particular all para-linked poly(arylene ether ketones).

In an electrophilic synthesis, the polymerization step involves the formation of an aryl ketone group from a carboxylic acid or acid derivative group and an aromatic compound containing an aromatic carbon bearing an activated hydrogen atom, i.e., a hydrogen atom displaceable under the electrophilic reaction conditions. The monomer system employed in the polymerization can be, for example, (a) a single aromatic compound containing both an acid or acid derivative group as well as an activated hydrogen atom on an aromatic carbon for example, p-phenoxybenzoyl chloride; or (b) a two component system of a dicarboxylic acid or acid derivative and an aromatic compound containing two activated hydrogen atoms, for example, terephthaloyl chloride and 1,4-diphenoxybenzene.

Electrophilic polymerization of this type is often referred to as Friedel-Crafts polymerization. Typically, such polymerizations are carried out in a reaction medium comprising the reactant(s), a catalyst, such as anhydrous aluminum trichloride, and solvent such as methylene chloride, carbon disulfide, nitromethane, nitrobenzene, or ortho-dichlorobenzene. Because the carbonyl groups of the reactant(s) and products complex with aluminum trichloride and thereby deactivate it, the aluminum trichloride catalyst is generally employed in an amount greater than one equivalent for each equivalent of carbonyl groups in the reaction medium. Other inorganic halides such as ferric chloride, may be employed as the catalyst. Since ferric chloride does not complex with carbonyl groups less than molar amounts may be used.

Such Friedel-Crafts polymerizations generally have produced an intractable reaction product difficult to remove from the reaction vessel and purify. Further, such processes have tended to produce polymer of undesirably low molecular weight and/or of poor thermal stability. The all para-linked poly(arylene ether ketones) have been particularly difficult to prepare under such Friedel-Crafts conditions. Typically, when a monomer or mixture of monomers is added to a suspension of the Lewis acid catalyst in a suitable diluent, the initially formed catalyst/monomer complex is soluble but as the polymerization proceeds, phase separation of the growing polymer chains and/or their complex with the Lewis acid catalyst occurs and the walls and floors of the reaction vessel becomes covered with a hard gel which becomes harder and more intractable as the reaction continues.

One factor that appears to contribute to the unsatisfactory results reported in the literature is that the para-linked polymers are more highly crystalline than the ortho, meta or mixed isomeric members of this polymer family and are therefore generally more insoluble in the reaction media typically used in such Friedel-Crafts reactions. This tends to result in the premature precipitation of the polymer in a form in which further polymerization does not occur. Another factor that may lead to these poor results is deactivation of the terminal aryloxy groups by complexation with aluminum chloride or alkylation of the terminal group which prevents further growth of the polymer chain. Also, side reactions, particularly at the ortho position of activated aromatic rings can result in a polymer that is branched and/or is more likely to cross-link at elevated temperatures such as those required for melt processing the polymer. It is generally recognized that in Friedel-Crafts reactions, ortho substitution of the polymer is more likely to occur if the reaction is conducted at elevated temperatures and/or for a relatively long reaction time. U.S. Pat. Nos. 3,065,205 to Bonner, 3,767,620 to Angelo et al, 3,516,966 to Berr, 3,791,890 to Gander et al, 4,008,203 to Jones and U.K. Pat. Nos. 971,227 and 1,086,021 both to Imperial Chemical Industries, Limited, disclose the preparation of poly(arylene ketones) by Friedel-Crafts polymerization and generally acknowledge some of the difficulties in producing tractable, melt stable polymers. For example, Gander et al provide a method of producing the polymers in granular form by special treatment of the reaction mixture before gellation can occur and Angelo et al provide the method of treating the polymer to reduce undesired end groups which result from side reactions during polymerization and which cause thermal instability of the polymer.

To overcome the disadvantages encountered in producing poly(arylene ketones) by the above described Friedel-Crafts polymerization, it has been proposed to use boron trifluoride catalyst in anhydrous hydrogen fluoride. See for example, U.S. Pat. Nos. 3,441,538 to Marks, 3,442,857 to Thornton, 3,953,400 to Dahl, and 3,956,240 to Dahl et al. This general process has been used commercially to produce polymer of the desired high molecular weight and thermal stability by solution polymerization. However, the use of boron trifluoride and hydrogen fluoride requires special techniques and equipment making this process difficult to practice on a commercial scale.

In the earlier copending commonly assigned application Ser. No. 594,503, is described a method of preparing poly(arylene ketones) under controlled or moderated conditions using a controlling agent or specified amounts of Lewis acid catalyst, depending on the monomer system employed. The controlling agent generally maintains the polymer in solution or in a swollen gel form in which polymerization to high molecular weight polymer could take place. Certain of the controlling agents described in this previous application have been discovered to be effective dispersants for the polymerization process. Further, effecting the polymerization, with or without a dispersant, under conditions which maintain the polymer and/or its complex with the Lewis acid catalyst suspended in the reaction medium, provides an additional method of producing substantially linear, high molecular weight polymer. Since the process of this invention maintains the polymer in suspension in finely divided particulate form, recovery and purification of the polymer is greatly facilitated.

SUMMARY OF THE INVENTION

In accordance with the process of this invention, a poly(arylene ether ketone) is prepared by Friedel-Crafts polymerization under conditions such that the polymer and/or its complex with the catalyst is suspended in the reaction medium. An effective amount of a dispersant may be included in the reaction medium. The polymer or its complex with the catalyst is in finely divided particulate form and is readily isolated from the reaction mixture and purified.

One aspect of this invention comprises a method of producing a poly(arylene ether ketone) which comprises polymerizing a monomer system comprising:

(I)
  (i) phosgene or an aromatic diacid dihalide together with
  (ii) a polynuclear aromatic comonomer of the formula

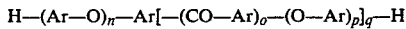
  H—(Ar—O)$_n$—Ar[—(CO—Ar)$_o$—(O—Ar)$_p$]$_q$—H wherein n is 1, 2 or 3, o is 1 or 2, p is 1, 2 or 3 and q is 0, 1, 2 or 3
  or
(II) an aromatic halide of the formula

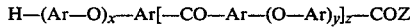
  H—(Ar—O)$_x$—Ar[—CO—Ar—(O—Ar)$_y$]$_z$—COZ wherein Z is halogen, x is 1, 2 or 3, y is 0, 1, 2 or 3 and z is 0, 1, 2, or 3;
and wherein each Ar is independently selected from substituted or unsubstituted phenylene, and substituted and unsubstituted polynuclear aromatic moieties activated to electrophilic substitution; in a reaction medium comprising:
(A) a Lewis acid in an amount effective to act as a catalyst for the polymerization;
(B) a non-protic diluent in an amount from 20 to about 93% by weight, based on the weight of the total reaction mixture; said diluent being substantially a non solvent for the poly(arylene ether ketone) and/or its complex with Lewis acid; and
(C) a dispersant, in an amount from about 0.01% to about 10% by weight, based on the weight of the monomer system.

The dispersant preferably comprises at least one molecular segment substantially compatible with the poly(arylene ether ketone) or its complex with the Lewis acid and substantially incompatible with the diluent under the reaction conditions and at least one molecular segment substantially compatible with the diluent and substantially incompatible with the poly(arylene ether ketone) or its complex with the Lewis acid under the reaction conditions. The dispersant may be polymeric or non-polymeric. Further, the dispersant preferably contains a group capable of donating an unshared pair of electrons with another compound, i.e., may be a Lewis base.

The process of this reaction can be carried out in the absence of a dispersant using a relatively non-polar diluent having a dielectric constant less that about 2.6. In this process, the monomer system is added to a particulate suspension of a catalytically effective amount of a Lewis acid in said relatively non-polar diluent.

Thus, another aspect of this invention comprises a method of producing a poly(arylene ether ketone) which comprises polymerizing a monomer system comprising:
(I)
  (i) phosgene or an aromatic diacid dihalide together with
  (ii) a polynuclear aromatic comonomer of the formula

  H—(Ar—O)$_n$—Ar[—(CO—Ar)$_o$—(O—Ar)$_p$]$_q$—H wherein n is 1, 2 or 3, o is 1 or 2, p is 1, 2 or 3 and q is 0, 1, 2 or 3
  or
(II) an aromatic halide of the formula

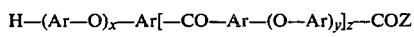
  H—(Ar—O)$_x$—Ar[—CO—Ar—(O—Ar)$_y$]$_z$—COZ wherein Z is halogen, x is 1, 2 or 3, y is 0, 1, 2 or 3 and z is 0, 1, 2, or 3;
and wherein each Ar is independently selected from substituted or unsubstituted phenylene, and substituted and unsubstituted polynuclear aromatic moieties activated to electrophilic substitution; in a reaction medium comprising:
(A) a Lewis acid in an amount effective to act as a catalyst for the polymerization; and
(B) a relatively non-polar diluent having a dielectric constant less than 2.6;
said polymerization being carried out under conditions such that the poly(arylene ether ketone) produced or its complex with the Lewis acid is suspended in said relatively non-polar diluent.

DETAILED DESCRIPTION OF THE INVENTION

In the electrophilic polymerization of the invention a poly(arylene ether ketone) is produced from an appropriate monomer system. The polymers produced by the process of the invention have repeat units of the general formula;

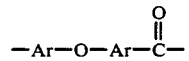
$$-\text{Ar}-\text{O}-\text{Ar}-\overset{\overset{\text{O}}{\|}}{\text{C}}-$$

wherein each Ar is independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Linking groups which can join aromatic rings in the aromatic moieties include, for example, ether oxygen, carbonyl, sulfone, sulfide, amide imide, azo, alkylene, perfluoroalkylene and the like.

The phenylene and polynuclear aromatic moieties can contain substitutents on the aromatic rings. Such substituents include, for example, phenyl, halogen, nitro, cyano, alkyl, 2-aralkenyl, alkynyl and the like. It is to be understood, that monomers containing such substituents can be used in preparing the polymers, provided that the presence of such substituents in the monomer does not interfere with the polymerization reaction to any significant extent.

These polymers are prepared in accordance with this invention by polymerizing an appropriate monomer system. Such monomer systems comprise:

(I)
(i) phosgene or an aromatic diacid dihalide together with
(ii) a polynuclear aromatic comonomer of the formula H—(Ar—O)$_n$—Ar[—(CO—Ar)$_o$—(O—Ar)$_p$]$_q$—H wherein n is 1, 2 or 3, o is 1 or 2, p is 1, 2 or 3 and q is 0, 1, 2 or 3
or
(II) an aromatic halide of the formula H—(Ar—O)$_x$—Ar[—CO—Ar—(O—Ar)$_y$]$_z$—COZ wherein Z is halogen, x is 1, 2 or 3, y is 0, 1, 2 or 3 and z is 0, 1, 2, or 3;
and wherein each Ar is independently selected from substituted or unsubstituted phenylene, and substituted and unsubstituted polynulear aromatic moieties activated to electrophilic substitution.

Aromatic diacid dihalide employed is preferably a dichloride or dibromide. Illustrative diacid dihalides which can be used include, for example, phosgene and compounds of the formula

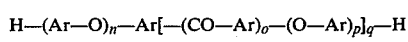

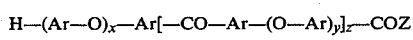

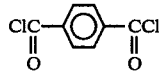

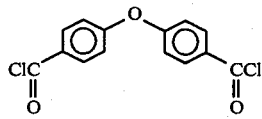

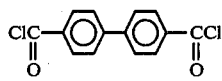

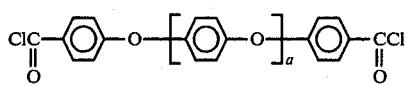

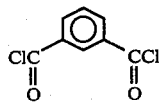

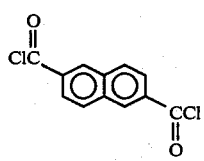

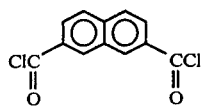

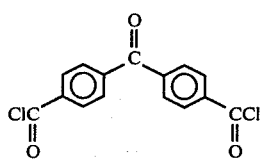

wherein a is 0–4.

Illustrated polynuclear aromatic comonomers which can be used with such diacid halides are:

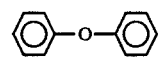

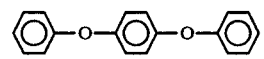

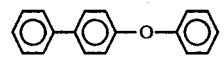

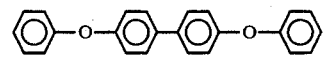

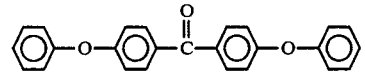

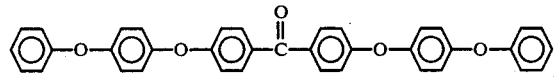

Illustrative aromatic acid halides which can be used include, for example:

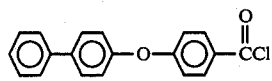

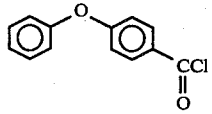

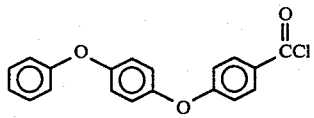

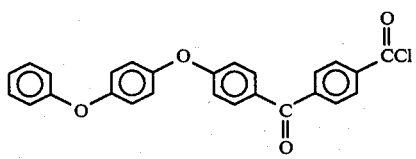

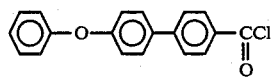

-continued

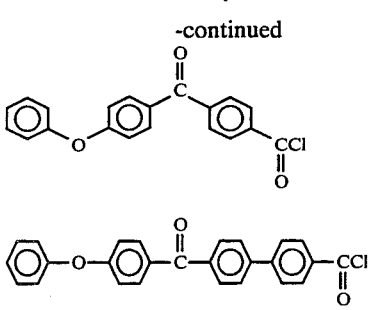

It is to be understood that combinations of monomers can be employed. For example, one or more diacid dihalides can be used with one or more polynuclear aromatic comonomers as long as the correct stoichiometry is maintained. Further, one or more acid halides can be included. In addition, monomers which do not contain an ether linkage can be employed as long as one or more comonomer used contains at least one ether oxygen linkage. Such comonomers include, for example:

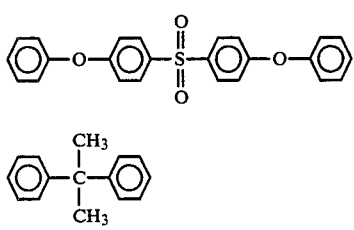

which can be used as the sole comonomer with an ether containing diacid dihalide or with phosgene or any diacid dihalide when used in addition to a polynuclear aromatic comonomer as defined above. Similarly,

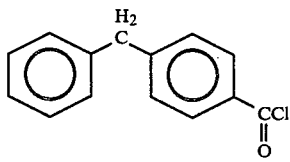

can be used as a comonomer together with an ether-containing polynuclear aromatic acid halide or as an additional comonomer together with a monomer system as defined in I.

In accordance with this invention the monomer system is polymerized under conditions such that the poly(arylene ether ketone) and/or its Lewis acid complex is suspended in the diluent during the reaction. The reaction medium comprises a Lewis acid in an amount effective to act as a catalyst for the polymerization, a nonprotic diluent in which the poly(arylene ether ketone) or its complex with the Lewis acid is substantially insoluble and, optionally, a dispersant.

The term "Lewis acid" is used herein to refer to a substance which can accept an unshared electron pair from another molecule. Lewis acids which can be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride.

The use of substantially anhydrous aluminum trichloride as the Lewis acid is preferred.

The amount of Lewis acid used depends on the particular Lewis acid and the particular monomer system. Lewis acids, such as ferric chloride and indium chloride do not complex with carbonyl groups and can be used in traditional catalytic amounts, e.g., 0.03 to 0.5 equivalent per equivalent of acid halide. Lewis acids such as aluminum trichloride complex with carbonyl groups and should be used in an amount at least equivalent to the carbonyl groups in the monomer system. The amount of Lewis acid in excess of this amount required to act as a catalyst for the polymerization varies depending on the monomer system.

In particular it varies depending on the presence of undeactivated aryloxy groups in the monomer systems. By undeactivated aryloxy groups is meant, those groups which are separated by at least one other aryloxy group from an aryl carbonyl group, as exemplified by the terminal aryloxy group of the compound of the formula:

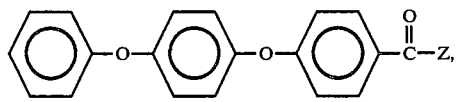

where Z is halogen.

In general, if the monomer system contains undeactivated aryloxy groups, a very slight excess of aluminum trichloride should be added, for example from 0.03 to 0.5 equivalents per equivalent of acid halide groups present in the monomer system. However, if the monomer system contains substantial amounts of p-benzene dicarbonyl dichloride, then additional Lewis acid has been found to be advantageous, for example above 0.8 equivalents per equivalent of undeactivated aryloxy groups.

In the absence of undeactivated aryloxy groups in the monomer system, that is all aryloxy groups are deactivated by the presence of a carbonyl on the adjacent aryl moiety, a different amount of Lewis acid is required. In this case, the amount of Lewis acid in excess of that required to complex with the carbonyl groups, is at least about 0.6 and preferably at least about 0.8 equivalents per equivalent of acid halide groups present.

As indicated above, the Friedel-Crafts polymerization reaction is preferably carried out in the presence of an effective amount of a dispersant (or dispersing agent). The dispersant acts to control the phase separation or formation of the polymer or polymer/Lewis acid complex to achieve the desired suspension of finely divided particulate polymer or polymer/Lewis acid complex suspended in the diluent. Such suspension can be readily separated and worked up to achieve the desired melt-processable, high molecular weight, substantially linear poly(arylene ether ketone).

The process of the invention is applicable to two types of suspension polymerization. In the first, the initial reaction mixture consists of two separate phases and the polymerization is heterogeneous throughout. In the second process the reaction mixture is initially homogeneous but as polymerization proceeds, polymer or polymer/Lewis acid complex separates out and the reaction proceeds thereafter in a heterogeneous manner.

Preferably the dispersant contains at least one segment substantially compatible with said poly(arylene ether ketone) or its complex with the Lewis acid and substantially incompatible with the diluent and at least one segment substantially incompatible with said poly(arylene ether ketone) or its complex with the Lewis acid and substantially compatible with the diluent.

A given segment is referred to as being substantially compatible with the diluent, the polymer, or the polymer/Lewis acid complex, if that segment is more solvated by the diluent, polymer or polymer/Lewis acid complex respectively under the reaction conditions, than by a theta solvent. Conversely, if a segment is referred to as substantially incompatible with the diluent polymer or polymer/Lewis acid catalyst, it is not more solvated by the diluent, polymer or polymer/Lewis acid complex under the reaction conditions than by a theta solvent.

The dispersants used in the practice of the invention are preferably amphipathic, that is the molecules comprise segments of markedly different or even opposing solubility tendencies. Dispersants which are particularly useful in the instant invention include Lewis bases. Such Lewis bases may be amphipathic or may be potentially amphipathic, that is, the complex of such a Lewis base with the Lewis acid present in the reaction medium exhibits amphipathic character. The term "Lewis base" is used herein to refer to a substance capable of donating an unshared electron pair to a Lewis acid, that is, it forms a complex with the Lewis acid used in the reaction medium. It has been found that Lewis bases which form a complex with the Lewis acid are preferred. The complex has a heat of association of at least about 5 kcal/mole, preferably at least about 10 kcal/mole and most preferably at least about 15 kcal/mole. A discussion on heats of association for Lewis acid/Lewis base complexes and their measurement is found in J. Chem Soc. (A), 1971, pages 3132-3135 (D. E. H. Jones et al). It is generally preferred that the Lewis base dispersant used should not be capable of reacting with the monomer system under the reaction conditions.

Typical dispersants which can be employed include, for example, amphipathic or potentially amphipathic amides, amines and their salts, esters, ethers, ketones, nitriles, nitro compounds, phosphates, phosphites, phosphonates, phosphonites, phosphines, phosphine oxides, phosphoramides, sulfides, sulfones, sulfonamides, sulfoxides, quaternary ammonium salts, salts of organic carboxylic, sulfonic and phosphonic acids, ester, acids and the like.

In one embodiment of the invention, the dispersant used in the polymerization process is a Lewis base having the structure:

$$R_m X_n$$

wherein X is a group substantially compatible with the poly(arylene ether ketone) and/or its complex with Lewis acid and substantially incompatible with the diluent, R is selected from organic groups, with at least one R being an organic group for which the diluent is more solvating than a theta solvent under the reaction conditions, and m is 1 to 6, and n is 1 to 4.

Each group X can represent a group capable of donating an unshared electron pair to another molecule. Preferably X is selected from:

—O—, —O—CO—, —CHO, —CO—, —COOH, —CO—NH$_2$,

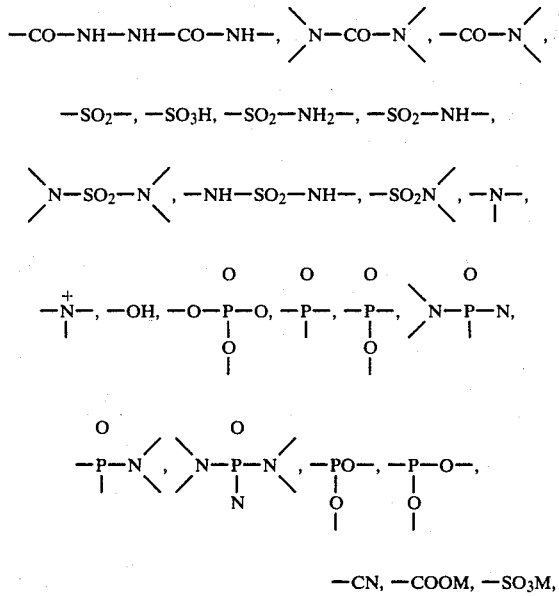

—CN, —COOM, —SO$_3$M, (where M is an alkali metal, ammonium or substituted ammonium).

Preferably each R is independently selected from alkyl, arylalkyl, alkylaryl, aryl groups and substituted derivatives thereof. Such substituted derivatives can contain additional X groups as defined above. Each R preferably contains from 1 to about 30 carbon atoms, with the proviso that the total number of carbon atoms present in the molecule is at least about 8. Preferably the dispersant contains from about 8 to about 120 carbon atoms.

Preferred dispersants include aliphatic carboxylic acids, aldehydes, ketones and alcohols and their derivatives such as, for example, alkali, ammonium or substituted ammonium, metal salts, esters and amides. Specific preferred dispersants include lithium, sodium or potassium salts of stearic acid, palmitic acid and the acids themselves, methyl stearate, stearyl acetate, lauryl stearate, stearyl stearate, stearamide, dimethyl stearamide, mono methyl stearamide, cetyl dimethyl ammonium chloride, cetyl trimethyl ammonium chloride, cetyl pyridinium chloride, stearyl methyl ketone, stearyl phenyl ketone, stearonitrile, distearyl ammonium bromide, dimethyl octanoamide, stearyl benzene sulfonamide, dikeptadecyl sulfone, dimethyl cetylamide, and the like.

In another embodiment of the invention, the dispersant used in the polymerization process is a polymer having segments A that are substantially compatible with the poly(arylene ether ketone) and/or its complex with Lewis acid, and preferably containing one or more X groups as hereinabove described, pendant from or incorporated into the molecular chain, the remainder (B segments) of said chain being substantially compatible with the diluent. Preferably the segments substantially compatible with the poly(arylene ether ketone) and/or its complex with Lewis acid, i.e., segments A, have a weight of at least about 150 Daltons, preferably at least about 300 Daltons, more preferably at least about 500 Daltons, especially at least about 1000 Daltons and most preferably about 2000 Daltons. When the said segments A are incorporated into the main chain, preferably the remaining portions of the chain (B segments) each have a weight of at least about 150 Daltons, preferably at least about 300 Daltons, more preferably at least about 500 Daltons, especially at least about 1000 Daltons and most preferably about 2000 Daltons. The upper limit to the molecular weight of such polymeric dispersants, or course, is set by considerations of solubility and ease of dissolution in the diluent. For example, polymeric dispersants may have number average molecular weights of about $1 \times 10^5$ and even about $2.5 \times 10^5$ Daltons. However, the preferred range of number average molecular weights of such polymeric dispersants is from at least about 1500 Daltons, especially at least about 3000 Daltons, most preferably about 5000 Daltons to about $5 \times 10^5$, especially about $2.5 \times 10^5$ most preferably about $1 \times 10^5$ Daltons.

Preferably the B segments or blocks in polymeric dispersants of the invention are selected from linear or branched chain polyolefin, perfluorinated polyolefin, perfluoropolyether or poly(vinyl aromatic) moieties or poly(aryl ether) moieties containing at least two fluoro, chloro or bromo substituents per aromatic ring.

Linear or branched polyolefin segments or blocks may contain small amounts of carbon-carbon unsaturation but are more preferably substantially saturated. More preferably each main chain carbon is attached to two carbon atoms and two hydrogen atoms, or to four carbon atoms or, if at a chain end, to one carbon atom and three hydrogen atoms.

Perfluoropolyolefin segments or blocks may be linear but preferably are branched.

Preferred perfluoropolyether segments or blocks include those containing the repeat units:

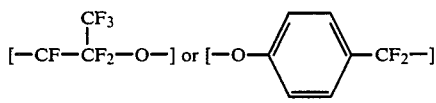

Preferred polyvinylaromatic segments or blocks comprise repeat units derived from ring substituted mono- or polyfluoro-, -chloro-, -bromo-, perfluoroalkyl- or perfluoroalkoxy-styrenes or -alphamethylstyrenes. The preferred A segments or blocks in polymeric dispersants comprise repeat units derived from acylated styrene, vinylpyridine, acrylonitrile, methacrylonitrile, methylmethacrylate and ethylacrylate residues.

Polymeric dispersants containing an X group pendant can be a random copolymer, one of the comonomers of which contains a pendant X group or it can be formed by acylation of a precursor polymer, prior to or subsequent to its introduction into the Friedel-Crafts polymerization reaction mixture.

Suitable polymeric dispersant and precursor polymers include block copolymers of styrene and butadiene (hydrogenated) or isoprene (hydrogenated); of 4-chloro (or bromo) styrene, 3,4-dichloro (or bromo) styrene or 2,6-dichloro (or bromo) styrene with 2-vinylpyridine, 4-vinylpyridine, methacrylonitrile, acrylonitrile, $C_1$ to $C_8$ alkyl methacrylate or acrylate such as methylmethacrylate or ethylacrylate; or of isobutylene and polyamine; or copolymers of ethylene and acrylic acid or an alkyl ester, amide or alkyl amide thereof; ethylene propylene-diene elastomeric terpolymers; substantially non-crystalline copolymers of tetrafluoroethylene and perfluoropropylene; butyl rubber; polyisobutylene, and the like.

Preferably the dispersant when polymeric is a block copolymer $[AB]_b A_c$ or $[BA]_b B_c$ wherein b is 1 to 20, c is 0 or 1 and segments A and B are as defined hereinabove.

Novel polymers especially useful in the practice of this invention include block copolymers of the hereinabove described general structure where A is a polymeric moiety comprising repeat units derived from halogenated styrenes such as 4-chlorostyrene, 3,4-dichlorostyrene or 2,6-dichlorostyrene residues, and B is a polymeric moiety comprising repeat units derived from substituted or unsubstituted vinylpyridines such as 2-vinylpyridine, 4-vinylpyridine, alpha, beta unsaturated esters such as methyl methacrylate and alpha, beta unsaturated nitriles such as acrylonitrile, methacrylonitrile and the like.

Mixtures of the above described polymeric and non-polymeric dispersants may be used if desired.

A combination of dispersants may be used if desired. For example, both a combination of a polymeric dispersant as described above and a Lewis base dispersant as described hereinabove can be used.

In addition to using a dispersant in accordance with this invention, a Lewis base, which may be a Lewis base which does not act as a dispersant, can be used in accordance with above mentioned application Ser. Nos. 541,083 and 594,503. The use of a Lewis base as described therein tends to solvate the growing polymer in the suspended form and reduces side reactions which can lead to branching and/or cross-linking.

While best results are obtained when the dispersant is added at the beginning of the polymerization, it may be added advantageously at any stage before decomplexation and/or isolation of the polymer occurs. Thus the dispersant may be present in the initial mixture of reactants, or added at the first sign of phase separation (usually a haziness in the reaction mixture) or at any stage thereafter to stabilize suspension formed during the polymerization.

The amount of dispersant present should be effective for its purpose, that is, generally from 0.01 to about 10% by weight, based on the weight of the monomer system. Preferably, the dispersant is present in an amount of about 0.1 to about 5% by weight, based on the weight of the monomer system. Amounts greater than 10% can be employed, if desired, however, no additional advantage is usually achieved by adding larger amounts. When the dispersant is a Lewis base, i.e. contains at least one "X" group as defined above, a proportionate increase in the amount of the Lewis acid may be desired, especially if a relatively large amount of the dispersant is used.

For example, an additional amount of Lewis acid generally about one equivalent per equivalent of X (the Lewis base group) may be used. When aluminum chloride is used as the Lewis acid, one equivalent is considered to be $AlCl_3$.

The temperature at which the reaction is conducted can be from about $-50°$ C. to about $+150°$ C. It is preferred to start the reaction at lower temperatures, for example, at about $-50°$ C. to about $0°$ C. particularly if the monomer system contains highly reactive monomers. After polymerization has commenced, the temperature can be raised if desired, for example, to increase the rate of reaction. It is particularly preferred to carry out the reaction at temperatures in the range of between about $-30°$ C. and $+100°$ C., although higher temperatures can be used if desired.

In accordance with the process of this invention at least part of the polymerization occurs while the growing polymer and/or its complex with Lewis acid is suspended in finely divided, particulate form in the diluent. The diluent is selected so that the polymer and/or the polymer Lewis acid complex are substantially insoluble in the diluent. Substantially insoluble connotes that the polymer and/or its complex with the Lewis acid has a solubility of less than 10 percent, more preferably less than 5 percent, most preferably less than 3 percent in the diluent. The diluent may, however, swell the polymer and/or polymer/Lewis acid complex. The diluent should also be relatively inert toward Friedel-Crafts reactions.

The diluent may be polar or non-polar and may comprise mixtures of components including mixtures of polar and non-polar components. Since, as discussed below, a non-polar diluent can be used to suspend the polymer even in the absence of a dispersant, use of a non-polar component permits use of a polar component which might otherwise dissolve the polymer and/or its complex with Lewis acid. This polar component may in some instances solvate the growing polymer in the suspended particles thereby facilitating polymerization. Suitable diluents include, for example, methylene chloride, carbon disulfide, o-dichlorobenzene, 1,2,4-trichlorobenzene, o-difluorobenzene, fluorinated and perfluorinated aliphatic compounds, 1,2-dichloroethane, tetrachloroethylene, 1,1,2,2-tetrachloroethane, cyclohexane, petroleum ether, heptane, hexane and mixtures thereof.

The diluent is used in an amount of at least about 15%, preferably at least about 30%, and up to about 93%, preferably up to about 80%, and more preferably up to about 70% by weight, based on the weight of the total reaction mixture.

While in most instances it is preferred to add monomer or monomers to the Lewis acid, other procedures may be used as desired, for example, the Lewis acid may be added to monomer, or the polynuclear aromatic comonomer may be added to diacid dihalide monomer/Lewis acid complex, or vice versa. With any of these procedures dispersant may be present initially in any component prior to contacting monomer and Lewis acid or may be added at any stage prior to decomplexation and/or separation of the polymer from the reaction mixture.

We have also discovered that by effecting the polymerization under certain conditions a suspension of the polymer in a diluent can be obtained without the use of a dispersant. For example, this can be achieved by use of a non-protic, relatively non-polar diluent. By "relatively non-polar" is meant that the diluent has a dielectric constant less than about 2.6. Advantageously, the monomer/Lewis acid complex, polymer and/or the polymer/Lewis acid complex are substantially insoluble in the non-polar diluent. Substantially insoluble connotes that monomer/Lewis acid complex, polymer and/or its complex with the Lewis acid has a solubility of about 5 percent or less, more preferably about 3 percent or less, most preferably about 1 percent or less in the non-polar diluent.

Non-polar diluents generally comprise one or more non-polar components such as cyclohexane, petroleum ether, heptane, hexane or the like. The diluent may further comprise a relatively polar component in addition to the non-polar component. By "relatively polar" is meant that that component has a dielectric constant greater than about 2.6. The presence of the polar component, as mentioned above, may solvate the growing polymer and/or its complex with Lewis acid within the suspended particles thereby facilitating polymerization. However, unlike the situation where a dispersant is used, it has been found that in the absence of dispersant only a certain amount of a polar component may be present in the diluent mixture. The diluent mixture should contain at least about 50%, preferably at least about 70%, by weight based on the weight of the total diluent mixture, of a nonpolar component or components. Polar components which can be used in the diluent mixture include, for example, methylene chloride, carbon disulfide, o-dichlorobenzene, 1,2,4-trichlorobenzene, o-difluorobenzene, 1,2-dichloroethane, tetrachloroethylene, 1,1,2,2-tetrachloroethane and mixtures thereof.

The diluent mixture is used in an amount of at least about 70%, preferably at least about 80%, and up to about 95%, preferably about 90% by weight, based on the weight of the total reaction mixture.

The monomer or the monomer/Lewis acid complex, substantially free of uncomplexed Lewis acid, optionally in a diluent is added to a suspension of a catalytically effective amount of Lewis acid in the diluent employed for the polymerization process. Preferably the suspension contains particles having an average particle size of less than about 500 microns, preferably less than about 20 microns.

It has also been discovered that in the absence of dispersant, the monomer or the monomer/Lewis acid complex should be substantially non-polymerized when added to the reaction medium. The monomer or monomer/Lewis acid catalyst is preferably added to the reaction medium dispersed or dissolved in the diluent or a component thereof. To prevent premature polymerization when the monomer system comprises an aromatic halide monomer or when both the phosgene or diacid dihalide and polynuclear aromatic comonomer are added in the same diluent system, the diluent system should be free of uncomplexed Lewis acid. When the monomer system comprises a diacid dihalide and a polynuclear aromatic comonomer, the comonomer is generally added to a suspension of a catalytically effective amount of Lewis acid in a diluent containing the diacid dihalide, thus preventing the possibility of premature polymerization.

Preferably the process of this invention is used to prepare poly(arylene ether ketones) of high molecular weight used to prepare in the form of a suspension. By "high molecular weight" is meant polymer having an inherent viscosity greater than about 0.6. Preferably the polymer prepared by the process of this invention has an inherent viscosity in the range of about 0.6 to about 2.0.

Throughout this application, inherent viscosity refers to the mean inherent viscosity determined accoding to the method of Sorenson et al, "Preparative Methods of Polymer Chemistry," 2nd edition, Interscience (1968), at page 44 [0.1 g polymer dissolved in 100 ml of concentated sulfuric acid at 25° C.].

If desired, the molecular weight of the polymer, the degree of branching and amount of gelation can be controlled by the use of, for example, capping agents as described in U.S. Pat. No. 4,247,682 to Dahl, the disclosure of which is incorporated herein by reference. The molecular weight of the polymer can also be controlled by a polymerization reaction utilizing a two-monomer system as described above, by employing a slight excess of one of the monomers.

Capping agents, when employed, are added to the polymerization reaction medium to cap the polymer on at least one end of the polymer chain. This terminates continued growth of that chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and increases melt stability. Both nucleophilic and electrophilic capping agents are used to cap the polymer at each end of the chain.

Preferred nucleophilic capping agents are 4-chlorobiphenyl, 4-phenoxybenzophenone, 4-(4-phenoxyphenoxy)benzophenone, biphenyl, 4-benzenesulonylphenyl phenyl ether, and the like.

Typical electrophilic capping agents are compounds of the formula:

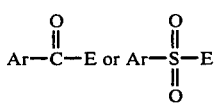

wherein Ar'' is phenyl, 3-chlorophenyl, 4-chlorophenyl, 4-cyanophenyl, 4-methylphenyl or an aromatic group substituted with an electron withdrawing substituent and E is halogen or other leaving group. Preferred electrophilic capping agents include benzoyl chloride, benzenesulfonyl chloride and the like.

Decomplexation can be accomplished by treating the polymerization reaction mixture with a decomplexing base after completion of polymerization. The base can be added to the reaction medium or the reaction medium can be added to the base. The decomplexing base must be at least as basic towards the Lewis acid as the basic groups on the polymer chain. Such decomplexation should be effected before isolation of the polymer from the reaction mixture.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylenesulfone, benzophenone, tetramethylammonium chloride, butanol and the like. The decomplexed polymer can then be removed by conventional techniques such as adding a non-solvent for the polymer which is a solvent for, or miscible with, the rest of the reaction mixture including the base-catalyst complex, spraying the reaction medium into a non-solvent for the polymer, separating the polymer by filtration, or evaporating the volatiles from the reaction medium and then washing with an appropriate solvent to remove any remaining base/catalyst complex from the polymer.

The following examples illustrate the preparation of poly(arylene ether ketones) in accordance with this invention.

EXAMPLE 1 To a 100 ml resin kettle equipped with an addition funnel, mechanical stirrer and nitrogen inlet was added 6.014 g (45.1 mmol) of AlCl$_3$ (Witco 0099) and 24.2 ml of 1,2-dichlorobenzene (ODCB). A solution of 4.060 g (20 mmol) of terephthaloyl chloride, 5.246 g (20 mmol) of 1,4-diphenoxybenzene, 1 mmol of a dispersant as indicated in Table 1, and 14.0 ml of ODCB was added at 25° C. to the stirred AlCl$_3$ suspension. The addition of the monomer/dispersant solution required 0.5 hour (h). During the reaction, the polymer-AlCl$_3$ complex precipitated from solution as a suspension of fine particles which would settle out if the stirring was stopped, but would redisperse readily when stirring recommenced. The reaction was allowed to proceed at 25° C. for 24 h. The stirrer was stopped and the suspension was allowed to settle out, the ODCB supernatant was discarded and the particulate polymer-Lewis acid complex was transferred to a 1 quart Waring blender containing about 300 ml of 1.2 N aqueous hydrochloric acid solution (HCl). The resultant decomplexed particulate polymer was isolated by filtration, washed on the filter with 300 ml of water, transferred to a blender containing 300 ml of MeOH, filtered, washed with 300 ml of MeOH and then digested in 300 ml of MeOH (50° C., 16 h.) followed by drying in vacuum. Inherent viscosities were measured on 0.1% solutions in 98% sulfuric acid at 25°, following the method of Sorenson et al, "Preparative Methods of Polymer Chemistry" 2nd edition, Interscience (1968) at page 44.

The results are shown on Table 1

TABLE 1

| Dispersant Used | Amount Used (wt %)* | Polymer Inh Viscosity |
| --- | --- | --- |
| N,N—Dimethyl- octanoamide | 2.2 | 1.37 |
| Di(n-octadecyl) ammonium bromide | 8.0 | 1.95 |
| Hexadecyltrimethyl- ammonium bromide | 4.6 | 2.22 |
| N—octadecyl benzene sulfonamide | 5.2 | 0.72 |
| Di(n-octadecyl) dimethyl ammonium bromide | 8.0 | 1.28 |
| Di(n-heptadecyl) sulfone | 8.1 | 1.56 |
| N,N—dimethyl octadecanoamide | 4.8 | 0.75 |
| Di(n-octadecyl) dimethyl ammonium bromide | 8.0 | 0.99 |
| FC143 (ammonium salt of a perfluorinated fatty acid) | 3.8 | 0.77 |
| FC93 (ammonium salt of a pefluorinated long chain sulfonic acid) | 3.8 | 0.71 |
| FC135 (perfluorinated long chain quarternary ammonium iodide) | 3.8 | 0.84 |

*The amount used is given as a percentage of the total reactants used.
(FC143, FC93 and FC135 are commercially available from Minnesota Mining and Manufacturing Co.)

EXAMPLE 2

Part A—Benzoylation of Kraton G 1650

To a stirred solution at 24° C., under nitrogen, of 3.54 g Kraton G 1650 (a hydrogenated styrene-butadiene block copolymer supplied by Shell Chem. Co.) and 3.17 g (0.0225 mole) benzoyl chloride in 50 ml 1,2-dichlorobenzene was slowly added 3.61 g (0.0271 mole) aluminum chloride. The reaction mixture was stirred for 1 hour and 15 minutes at 24° C., and the resulting light orange solution was poured into a stirred mixture of ice and dilute aqueous hydrochloric acid. The organic layer was separated, washed with water and with dilute aqueous potassium hydroxide. Cyclohexane washes were used to rinse the clouded separated aqueous layers. The cyclohexane extracts were combined with the o-dichlorobenzene layer, dried over anhydrous magnesium sulfate and the solvents removed under vacuum in a rotary evaporator. Further drying of the residue in a vacuum oven at 120° C./1 mm, gave 4.38 g of pale yellow rubbery product, hereinafter referred to as benzoylated Kraton G 1650, showing a ketone carbonyl IR band at 6.02 microns and para substitution of the styrene residues by NMR.

Part B—Preparation of Polymer

To a stirred suspension, under nitrogen, of 3.73 g (0.028 mole) aluminum chloride in 28 ml of carbon disulfide (Aldrich, Gold Label) at 24° C., was slowly added 4.66 g (0.020 mole) p-phenoxybenzoyl chloride, resulting in a light yellow solution which soon formed two liquid layers. These, on shaking to give a suspension, followed by standing undisturbed, showed rapid layer separation. Dropwise addition of 0.0957 g (2.0 wt % of monomer) benzoylated Kraton G 1650, in 4 ml of the same solvent, to the stirred reaction mixture, followed by shaking, produced a stabilized suspension. This was stirred magnetically for 48 hours to produce a readily flowable orange-yellow dispersion of spherical polymer-aluminum chloride complex particles averaging about 20 microns in diameter. Decomplexation with excess dilute HCl, then methanol followed by filtration, extraction with methanol for 15 hours and refiltration, then washing with acetone and water gave colorless polymer powder (dried 2 hours at 130° C. in vacuum) which yielded a light colored, flexible slab on pressing at 400° C.

Polymerization in the absence of benzoylated Kraton G 1650, i.e., not according to the teaching of this embodiment of the invention, resulted in the separation of a viscous tacky layer in the early stages of the polymerization that gradually became tough and hard, covering the walls and bottom of the reactor. Decomplexation was slow, producing a massive lump of hardened polymer.

EXAMPLE 3

To a stirred suspension, under nitrogen, of 3.80 g (0.0285 mole) aluminum chloride in 30 ml of a 2:1 mixture by volume of carbon disulfide and cyclohexane at 24° C, was slowly added 4.67 g (0.020 mole) p-phenoxybenzoyl chloride resulting in a light yellow solution which soon formed two liquid layers. These, on shaking to give a suspension followed by standing undisturbed, showed rapid layer separation. Dropwise addition of 0.100 g (2.0 wt % of monomer) benzoylated Kraton G 1650, in 3 ml of the same solvent mixture, to the stirred reaction mixture, followed by shaking, produced a stabilized suspension. This was stirred magnetically for 40 hours producing a readily stirable yellow dispersion of spherical polymer-aluminum chloride complex particles averaging about 20 microns in diameter. Decomplexation with excess water followed by addition of methanol, filtration, soaking of the filtercake in methanol for 15 hours, filtration, washing with acetone and water gave colorless polymer powder (dried 2 hours at 130° C. in vacuum) of inherent viscosity 0.68, pressing to a light colored flexible slab at 400° C.

EXAMPLE 4 To a stirred suspension, under nitrogen, of 1.62 g (0.0121 mole) aluminum chloride in 7 ml of a 1:1 mixture by volume of o-dichlorobenzene and cyclohexane at 24° C, was slowly added 1.42 g (0.0061 mole) p-phenoxybenzoyl chloride, followed by slow addition of a partial solution of 0.0284 g benzoylated Kraton G 1650 in the same solvent mixture (2 ml), resulting in a light yellow suspension which was stirred for six days at 24° C. Decomplexation with water and methanol, and leaching with methanol for 18 hours, followed by washing with acetone and water, gave a colorless powder (dried at 130° C./1 mm) of inherent viscosity 1.85, yielding a flexible light colored slab on pressing at 400° C.

EXAMPLE 5 To a stirred solution of 2.62 g (0.0100 mole) 1,4-diphenoxybenzene and 2.04 g (0.0100 mole) terephthaloyl chloride in 42 ml o-dichlorobenzene at about −20° C., under nitrogen, was slowly added 3.20 g (0.024 mole) aluminum chloride (coarse powder) under nitrogen over a period of about 5 minutes, yielding a dark red solution. Then a solution of 0.090 g (2 wt % of monomers) benzoylated Kraton G 1650 in 3 ml o-dichlorobenzene was slowly added at about −12° C. The reaction temperature was then gradually increased, while stirring vigorously, to +10° C. over a period of 7 minutes, resulting in the formation of a fine suspension. The reaction temperature reached 24° C. in another 30 minutes and stirring was continued for 24 hours at 24° C. to give a very fluid red suspension consisting of very fine spherical particles and particle clusters as seen under the microscope. Decomplexation with excess water, followed by dilution with methanol, filtration, and leaching of the filtercake with methanol for 15 hours, followed by washing with acetone and water, gave colorless polymer powder (dried 4 hours at 130° C./1 mm) of 1.12 inherent viscosity, which yielded a light colored slab on pressing at 400° C.

EXAMPLE 6

To a stirred suspension, under nitrogen, of 1.42 g (0.0061 mole) aluminum chloride in 5 ml of a 1:1 mixture by volume of o-dichlorobenzene and cyclohexane cooled to 0° C., was slowly added 0.50 g (0.00574 mole) dimethyl acetamide (DMAC) (Aldrich, Gold Label) resulting in two liquid layers plus excess solid aluminum chloride particles. Then 1.42 g (0.0061 mole) p-phenoxybenzoyl chloride was slowly added at 24° C. in about 5 minutes resulting in two liquid phases that underwent rapid layer separation on standing after shaking. A solution of 0.0284 g (2 wt % of monomer) benzoylated Kraton G 1650 in 2 ml of the same solvent mixture was slowly transferred (after 5 minutes) to the stirred reaction mixture, resulting in the formation of a suspension (yellow milky appearance). Stirring was continued for 40 hours. The reaction mixture remained essentially unchanged in appearance as a very fluid yellow milky suspension. Microscopic examination showed this to consist of nearly spherical clear particles of about 30 micron average diameter. Decomplexation with water, followed by methanol, acetone and water leaching, yielded colorless powder (dried at 130° C./1 mm) of 2.17 inherent viscosity.

Examples 7 to 9 are examples of the production of a particulate polymer and polymer complex without the use of an added dispersant.

EXAMPLE 7

To a stirred suspension, under nitrogen, of 2.87 g (0.0215 mole) aluminum chloride (coarse power) in 50 ml cyclohexane (Aldrich, HPLC grade) at 60°-78° C., was very slowly added (dropwise, in portions) 2.50 g (0.0107 mole) p-phenoxybenzoyl chloride over a period of 1 hour and 15 minutes, resulting in a light yellow suspension of the polymer complex. The reaction mixture was then boiled under reflux at 80°-82° C. (while stirring) for 3 hours to complete the polymerization. The yellow particulate suspension obtained was cooled in an ice bath and decomplexed by slow addition of water (while stirring) followed by methanol, then filtered to give a light colored particulate product. This was washed with methanol and then leached with methanol for 16 hours, followed by a 2 hour reflux in water and drying (2 hours at 120° C./1 mm) to yield a colorless polymer of inherent viscosity 0.82, showing an absence of carbonium ions in CF3CO2H—CH2Cl2 and giving to a light colored flexible slab on pressing for 2 minutes at 400° C.

EXAMPLE 8

Aluminum chloride (0.85 g, 0.0064 mole) was slowly added to a solution of 1.42 g (0.0061 mole) p-phenoxybenzoyl chloride in 5 ml carbon disulfide cooled in an ice bath. The mixture was stirred for a few minutes, resulting in dissolution of most of the aluminum chloride and formation of two liquid layers. The reaction mixture was maintained at about 0°-5° C. to slow down excessive polymerization. The polar bottom layer (of monomer and possibly, oligomer complexes) was slowly added (dropwise, in portions) to a stirred suspension, under nitrogen, of 0.85 g (0.0064 mole) aluminum chloride (fine powder) in 25 ml cyclohexane at 70°-78° C., resulting in evolution of carbon disulfide and HCl and formation of an easily stirable slurry of light yellow precipitate of polymer-aluminum chloride complex. Heating and stirring was continued for 2 hours (80°-82° C.), followed by decomplexation with water at 0°-5° C., dilution with methanol, filtration, leaching of the filtercake with excess methanol at room temperature for 16 hours, yielding colorless polymer.

EXAMPLE 9

Aluminum chloride (0.85 g, 0.0064 mole) was slowly added to a solution of 1.42 g (0.0061 mole) p-phenoxybenzoyl chloride in 2 ml o-dichlorobenzene at 24° C. (water bath cooling). The mixture was stirred for a few minutes, resulting in dissolution of most of the aluminum chloride. The complex solution was added very slowly (dropwise, in portions) to a stirred suspension, under nitrogen, of 0.85 g (0.0064 mole) aluminum chloride (ground powder) in 30 ml cyclohexane at 60–70° C., resulting in a light yellow suspension. This was cooled in an ice bath and decomplexed by slow addition of water (while stirring) followed by addition of methanol, to give a light colored filtercake. This was washed with methanol and then leached with methanol for 16 hours and dried (2 hours at 120° C./1 mm), yielding colorless polymer powder.

EXAMPLE 10

To a stirred suspension, under nitrogen, of 4.07 g (0.0305 mole) aluminum chloride in 12 ml of a 1:1 mixture by volume of o-dichlorobenzene and cyclohexane at 24° C., was slowly added 0.506 g (0.0057 mole) DMAC (cooling with a water bath as required) then 2.33 g (0.010 mole) p-phenoxybenzoyl chloride was slowly added, followed by a solution of 0.0932, (2 wt % of monomer) Kraton G 1650 in 3 ml of the same solvent mixture resulting in the formation of a suspension. After 16 hours at room temperature the reaction mixture was heated to 65° C. Decomplexation and work up of the reaction mixture, as in Example 9, gave a nearly colorless polymer powder of inherent viscosity 2.27 which was pressed to yield a light colored, flexible slab at 400° C.

EXAMPLE 11

To a stirred suspension, under nitrogen, of 8.47 g (0.0635 mole) ground aluminum chloride in 30 ml of a 1:1 by volume mixture of o-dichlorobenzene and cyclohexane cooled to 0° C., was slowly added 1.0110 g (0.01148 mole) DMAC resulting in two liquid layers plus excess solid aluminum chloride particles. Then 4.66 g (0.0200 mole) p-phenoxybenzoyl chloride was added slowly at 24° C, resulting in two liquid phases that underwent rapid layer separation on standing after shaking. A solution of 0.0932 g (2 wt % of monomer) benzoylated Kraton G 1650 and 0.100 g dioctadecyldimethylammonium bromide in 5 ml of the same solvent mixture was slowly transferred to the stirred reaction mixture, resulting in a suspension (yellow milky appearance). Stirring was continued for 48 hours, followed by decomplexation with water, then by methanol, acetone and water leaching, to yield a colorless powder (dried at 130° C./1 mm) which could be pressed to a flexible light colored slab at 400° C.

EXAMPLE 12

To a stirred suspension, under nitrogen, of 2.95 g (0.0221 mole) aluminum chloride in 8 ml of a 1:1 volume mixture of o-dichlorobenzene and cyclohexane cooled to 0° C., was slowly added 0.38 g (0.0055 mole) n-butyronitrile. Then 2.33 g (0.0100 mole) p-phenoxybenzoyl chloride was added slowly at 24° C., resulting in two liquid phases that underwent rapid layer separation on standing after shaking. A solution of 0.070 g (3 wt % of monomer) of a hydrogenated styrene/butadiene (30/70, Mn=50×105) block co-polymer (Phillips Petroleum Co.) in 3 ml of the same solvent mixture was added to the stirred reaction mixture, resulting in a suspension (yellow milky appearance). Stirring was continued for 24 hours. The reaction mixture remained essentially unchanged in appearance, as a very fluid yellow milky suspension. Microscopic examination showed this to consist of nearly spherical clear particles. The mixture was then heated at about 50° C. for 1 hour to complete the polymerization. Decomplexation with water, followed by methanol, acetone and water leaching, yielded colorless powder (dried at 130° C./1 mm) of 1.85 inherent viscosity, pressing to flexible light colored slabs at 400° C.

EXAMPLE 13

To a stirred suspension, under nitrogen, of 2.99 g (0.0224 mole) aluminum chloride in 10 ml of a 1:1 by volume mixture of o-dichlorobenzene and cyclohexane cooled to 0° C., was slowly added 0.39 g (0.0057 mole) n-butyronitrile. A solution of acylated ethylene/acrylic acid was prepared by dissolving 0.050 g ethylene/acrylic acid (15%) co-polymer (Scientific Polymer Products Inc.) in a solution of 2.35 g (0.011 mole) p-phenoxybenzoyl chloride in 2 ml o-dichlorobenzene, with heating. The cooled solution was slowly added to the vigorously stirred reaction mixture, aluminum chloride, resulting in the formation of a fine suspension (yellow milky appearance). Stirring was continued for 24 hours. The reaction mixture remained essentially unchanged in appearance, as a very fluid yellow milky suspension. Microscopic examination showed this to consist of nearly spherical particles of about 10 micron average diameter. Decomplexation with water, followed by methanol, acetone and water leaching, yielded colorless polymer powder of 1.65 inherent viscosity, which could be pressed to a light colored flexible slab at 400° C.

EXAMPLE 14

To a stirred suspension, under nitrogen, of 3.00 g (0.0225 mole) aluminum chloride in 8 ml of a 1:1 by volume mixture of o-dichlorobenzene and cyclohexane cooled to 0° C., was slowly added 0.39 g (0.0057 mole) n-butyronitrile. Then 2.35 g (0.011 mole) p-phenoxybenzoyl chloride was slowly added (dropwise) at 24° C., resulting in two liquid phases that underwent rapid layer separation on standing after shaking. A solution of phosphorylated ethylene/acrylic acid copolymer was prepared by dissolving 0..050 g ethylene/acrylic acid (15%) co-polymer (Scientific Polymer Inc.) in 3 ml o-dichlorobenzene containing about 0.10 g $POCl_3$ and a small drop of DMAC, with heating. The cooled solution was slowly added to the vigorously stirred reaction mixture, resulting in an emulsion or suspension (yellow milky appearance). Stirring was continued for 24 hours. The reaction mixture remained essentially unchanged in appearance, as a very fluid yellow milky suspension. Microscopic examination showed this to consist of nearly spherical particles.

Decomplexation with water, followed by methanol, acetone and water leaching, yielded colorless polymer powder of 0.77 inherent viscosity, which could be pressed to a light colored flexible slab at 400° C.

EXAMPLE 15

To a stirred suspension, under nitrogen, of 3.00 g (0.0225 mole) aluminum chloride in 10 ml of a 1:1 by volume mixture of o-dichlorobenzene and cyclohexane cooled to 0° C., was slowly added 0.39 g (0.0057 mole) n-butyronitrile. Then 2.33 g (0.010 mole) p-phenoxybenzoyl chloride was slowly added (dropwise) at 24° C., resulting in two liquid phases that underwent rapid layer separation on standing after shaking. A solution of an ethylene/acrylic acid copolymer/aluminum chloride complex was prepared by dissolving 0.050 g ethylene/acrylic acid (15%) co-polymer (Scientific Polymer Products Inc.) in 3 ml o-dichlorobenzene containing about 0.50 g aluminum chloride, with heating. The cooled solution was slowly added to the vigorously stirred reaction mixture, resulting in a suspension of little gel particles. Stirring was continued for 24 hours. Decomplexation with water, followed by methanol, acetone and water leaching, yielded colorless polymer granules of 1.50 inherent viscosity which could be pressed to a light colored flexible slab at 400° C.

EXAMPLE 16

To a stirred suspension, under nitrogen, of 3.19 g (0.024 mole) aluminum chloride in 8 ml of an 1:1 by volume mixture of o-dichlorobenzene an cyclohexane cooled to 0° C., was slowly added 0.40 g (0.0057 mole) butyronitrile resulting in two liquid layers plus excess solid aluminum chloride particles. The 2.33 g (0.0100 mole) p-phenoxybenzoyl chloride was added slowly at 24° C., resulting in two liquid phases that underwent rapid layer separation on standing after shaking. A solution of 0.050 g (2 wt % of monomer) ring-brominated Kraton G 1650 in 3 ml of the same solvent mixture was slowly transferred (about 5 minutes) to the stirred reaction mixture, resulting in a suspension (yellow milky appearance). Stirring was continued for 20 hours. The reaction mixture remained essentially unchanged in appearance, as a very fluid yellow milky emulsion or suspension. Microscopic examination showed this to consist of nearly spherical clear particles of about 20 micron average diameter. Decomplexation with water, followed by methanol, acetone and water leaching, yielded polymer powder (dried at 130° C./1 mm), which could be pressed to a flexible slab at 400° C.

EXAMPLE 17

To a stirred solution, under nitrogen, of 2.623 g (0.0100 mole) 1,4-diphenoxybenzene, 2.030 g (0.0100 mole) terephthaloyl chloride, 0.100 cetyltrimethylammonium bromide (Aldrich, dried 1 hour at 120° C/1 mm), 0.080 g Kraton G 1650, and benzoylated Kraton G 1650 in 45 ml of a 2:1 by volume mixture of o-dichlorobenzene and cyclohexane, cooled to about −18° C., was added 3.40 g (0.0255 mole) aluminum chloride (coarse powder) over a period of about 2 minutes. On warming to −10° C. a dull brownish orange-red solution containing some undissolved aluminum chloride was obtained. By 0° C. (reached in about 15 minutes after aluminum chloride addition), a red-orange emulsion or suspension was obtained, and the cooling bath was removed. After another hour at 24° C., a very fluid orange emulsion was obtained. This was stirred for another 24 hours at room temperature, cooled on ice, and worked up by slow addition of methanol. The resulting colorless fine suspension was filtered and the filtercake was washed with methanol, water and acetone, yielding a colorless polymer powder.

EXAMPLE 18

To a stirred suspension, under nitrogen, of 2.40 g (0.018 mole) $AlCl_3$ in 12 ml of tetrachloroethylene at 24° C., was slowly added 2.33 g (0.010 mole) p-phenoxybenzoyl chloride resulting in a light yellow solution which soon formed two liquid layers. These, on shaking to give a suspension, followed by standing undisturbed, showed rapid layer separation. Dropwise addition of 0.050 g (2.0 wt % of monomer) Kraton G 1650, predissolved in 3 ml of the same solvent, to the stirred reaction mixture, followed by shaking, produced a stabilized emulsion or suspension. This was stirred magnetically for 16 h producing a readily stirable orange-yellow dispersion of polymer $AlCl_3$ complex particles. The stirred reaction mixture was heated to 90° C. and cooled. Decomplexation with excess dilute HCl, followed by addition of methanol, filtration, soaking of the filtercake in methanol for 14 h, filtration, washing with acetone and water gave colorless polymer powder (dried 2 h at 130° C./vacuum) pressing to a light colored flexible slab at 400° C.

EXAMPLE 19

This example illustrates the preparation of block copolymers especially useful as dispersants in the instant invention. All monomers used were freshly distilled from calcium hydride and the solvent (tetrahydrofuran) was freshly distilled from a mixture of sodium and benzophenone. To the stirred solvent (55 ml) placed in a dry flask was added 4-chlorostyrene (6.44 ml, 0.05 mol) or 3,4-dichlorostyrene, the whole being cooled at −78° C. under nitrogen. The initiator, butyl lithium (0.20 ml of a 2.5 mol solution in hexane) was added and the mixture maintained at −78° C. for one hour after which 2-vinyl pyridine (2.73 ml, 0.025 mol) was added and the solution stirred at −78° C. for a further hour. The polymeric anion was quenched by adding a small amount of methanol and the block co-polymer precipitated by pouring into water or methanol contained in a blender, washed several times and dried in a vacuum oven overnight at about 90° C. Integration of the 1H NMR spectrum of the product indicated that it was the expected 2:1 block co-polymer. In a similar manner block co-polymers of 4-chlorostyrene with 4-vinylpyridine, methylmethacrylate and methacrylonitrile; of 2,6-dichlorostyrene with methyl methacrylate; and of 3,4-dichlorostyrene with 2-vinylpyridine and methyl methacrylate were prepared and characterized by 1H NMR spectroscopy. In each polymer preparation the molar ratio of the first monomer to the second monomer, that is to say of the "B" block monomer to the "A" block monomer as hereinabove defined, was two to one.

EXAMPLE 20

To a stirred suspension of aluminum chloride (8.0 g) in carbon disulfide was added p-phenoxybenzoyl chloride (9.3 g, 12% concentration based on total solvent) over ten minutes at 10 C. The dispersing agent (poly(4-chlorostyrene/2-vinylpyridine), 0.47 g) prepared as in Example 19, dissolved in 5 ml of carbon disulfide, was then added and the reaction mixture allowed to warm to room temperature. Within one hour the initially clear orange solution became a milky orange dispersion which after standing overnight had a particle size of about 40 to 100 microns. The reaction product was precipitated and washed with dimethylformamide, then washed with dilute hydrochloric acid and dried in vacuum.

In a similar experiment outside the teaching of the instant invention in which the dispersant was omitted the reaction mixture separated into two phases, a supernatent clear liquid and a very hard intractable lump at the bottom of the flask.

In similar experiments within the teaching of the invention other solvents dispersants, diluents and reaction conditions were used with the results shown in Table 2. In all instances the reaction product was obtained as a suspension or dispersion.

EXAMPLE 21

To a resin kettle was added, under nitrogen, terephthaloyl chloride (2.03 g), 4,4'-diphenoxybenzophenone (3.66 g) and a 1:1 w/w mixture or o-dichlorobenzene and cyclohexane (43 ml) with stirring and the whole cooled to 0° C. Aluminum chloride (5.2 g) was then added (10 minutes) followed by poly(4-chlorostyrene/2-vinylpyridine) (0.25 g), dissolved in 8 mls of the solvent mixture and washed in with a further 5 ml of solvent. The reaction mixture was allowed to warm to room temperature when it formed an orange dispersion of about 5 micron particles. The reaction mixture was worked up as described in Example 20.

EXAMPLE 22

A reaction was carried out as described in Example 20 except that as dispersant was used a mixture of poly(4-chlorostyrene/2vinylpyridine) and distearyldimethylammonium bromide (2.5% of each based on the monomer). The reaction mixture formed an orange dispersion after one hour. The inherent viscosity of the polymer obtained was 0.83.

TABLE 2
Use of Block Co-polymer Dispersants

| Solvent | Ratio of AlCl3 To Basic Species | Block Co-polymer Type | % Based on On Monomer | Inh. Visc. |
|---|---|---|---|---|
| Carbon disulfide | 1.5 | 4-chlorostyrene/ 2-vinylpyridine | 5.0 | 1.2 |
| ODCB/ cyclohexane (1:1 w/w) | 1.5 | 4-chlorostyrene/ 2-vinylpyridine | 5.0 | 0.71 |
| Carbon disulfide | 1.5 | 4-chlorostyrene/ methylmethacrylate | 5.0 | 1.4 |
| ODCB/ cyclohexane (1:1 w/w) | 1.5 | 4-chlorostyrene/ methylmethacrylate | 5.0 | 0.82 |
| Carbon disulfide | 1.5 | 4-chlorostyrene/ 4-vinylpyridine | 5.0 | 1.66 |
| Chlorobenzene | 1.5 | 4-chlorostyrene/ 2-vinylpyridine | 5.0 | 0.71 |
| Carbon disulfide | 1.5 | 3,4-dichlorostyrene/ methylmethacrylate | 5.0 | 2.03 |
| ODCB (2:1 w/w) | | | | |
| Carbon disulfide | 1.5 | 2,6-dichlorostyrene/ methylmethacrylate | 5.0 | 1.29 |

What is claimed is:

1. A method of producing a poly(arylene ether ketone) which comprises polymerizing a monomer system comprising:

I.
(i) phosgene or an aromatic diacid dihalide together with
(ii) a polynuclear aromatic comonomer of the formula H—(Ar—O)$_n$Ar[—CO—Ar)hd o(O—Ar)$_p$]$_q$—H wherein n is 1, 2 or 3, o is 1 or 2, p is 1, 2 or 3 and q is 0, 1, 2 or 3
or
II. an aromatic halide of the formula H—(Ar—O)$_x$—Ar[—CO—Ar—(O—Ar)y]$_z$—COZ wherein Z is halogen, x is 1, 2 or 3 y is 0, 1, 2 or 3 and z is 0, 1, 2 or 3; and wherein each Ar is independently selected from substituted or unsubstituted phenylene, and substituted and unsubstituted polynuclear aromatic moieties activated to electrophilic substitution; in a reaction medium comprising:

(A) a Lewis acid in an amount effective to act as a catalyst for the polymerization;
(B) a non-protic diluent in an amount from 20 to about 93% by weight, based on the weight of the total reaction mixture; said diluent being substantially a non-solvent for the poly(arylene ketone) and/or its complex with Lewis acid; and (C) a dispersant, in an amount of about 0.01% to about 10% by weight, based on the weight of the monomer system.

2. A method in accordance with claim 1 wherein said dispersant is present in an amount from about 0.1% to about 5% by weight, based on the weight of the monomer system.

3. A method in accordance with claim 1 wherein the dispersant is polymeric.

4. A method in accordance with claim 3 wherein the dispersant is a copolymer of ethylene and acrylic acid or an alkyl ester, amide or alkyl amide thereof; ethylene-propylene-diene elastomeric terpolymers; substantially noncrystalline copolymers of tetrafluoroethylene and perfluoropropylene; butyl rubber; or polyisobutylene.

5. A method in accordance with claim 3 wherein the dispersant is a block co-polymer.

6. A method in accordance with claim 5 wherein the dispersant is a block co-polymer of styrene and butadiene (hydrogenated) or isoprene (hydrogenated); 4-chloro styrene, -bromostyrene, 3,4-dichloro styrene, 3,4-dibromo styrene, or 2,6-dichloro styrene, 2,6-dibromo styrene, with -vinylpyridine, 4-vinylpyridine, methacrylonitrile, acrylonitrile, $C_1$ to $C_8$ alkyl methacrylate or acrylate; or of isobutylene and a polyamine.

7. A method in accordance with claim 1 wherein said dispersant is an organic compound having the formula $R_mX_n$ 

wherein each R is an organic group, at least one of which is more solvating than a theta solvent under the reaction conditions, X is a group capable of donating an unshared electron pair to another molecule m is 1–4 and n is 1–4.

8. A method in accordance with claim 7 wherein each R is independently selected from alkyl, arylalkyl, alkylaryl, aryl groups containing from 1 to about 30 carbon atoms and substituted derivatives thereof, with the proviso that the total number of carbon atoms present in the molecule is at least about 8.

9. A method in accordance with claim 7 wherein X is selected from

—O—, —O—CO—, —CHO, —CO—, —COOH, —CO—NH$_2$,

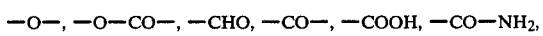

—SO$_2$—, —SO$_3$H, —SO$_2$—NH$_2$—, —SO$_2$—NH—,

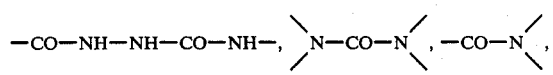

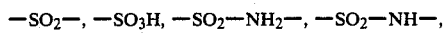

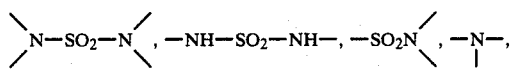

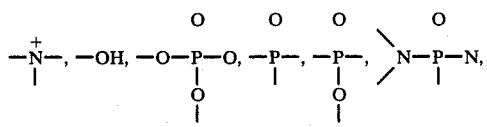

-continued

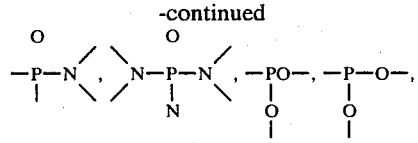

—CN, —COOM, —SO$_3$M,

10. A method in accordance with claim 1 wherein the dispersant is selected from lithium, sodium and potassium salts of stearic acid, palmitic acid and the acids themselves, methyl stearate, stearyl acetate, lauryl stearate, stearyl stearate, stearamide, dimethyl stearamide, mono methyl stearamide, cetyl dimethyl ammonium chloride, cetyl trimethyl ammonium chloride, cetyl pyridinium chloride, stearyl methyl ketone, stearyl phenyl ketone, stearonitrile, distearyl ammonium bromide, dimethyl octanoamide, stearyl benzene sulforamide, dikeptadecyl sulfone and dimethyl cetylamide.

11. A method in accordance with claim 1 wherein said monomer system comprises an aromatic acid halide of the formula

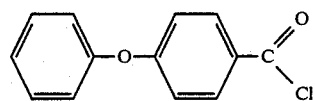

12. A method in accordance with claim 1 wherein said monomer system comprises an aromatic diacid dihalide of the formula

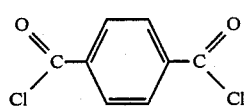

and a polynuclear aromatic comonomer of the formula

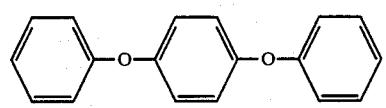

13. A method in accordance with claim 1 wherein said non-protic, diluent comprises methylene chloride, carbon disulfide, o-dichlorobenzene, 1,2,4-trichlorobenzene, o-difluorobenzene, 1,2-dichloroethane, 1,1,2,2-tetrachloroethane cyclohexane, petroleum ether, heptane or hexane or mixtures thereof.

14. A method in accordance with claim 1 wherein said Lewis acid is aluminum trichloride.

15. A method of producing a poly(arylene ether ketone) which polymerizing a monomer system comprising:
I.
(i) phosgene or an aromatic diacid dihalide together with
(ii) a polynuclear aromatic comonomer of the formula H—(Ar—O)$_n$Ar[(—CO—Ar)$_o$(O—Ar)$_p$]$_q$—H wherein n is 1, 2 or 3, o is 1 or 2, p is 1, 2 or 3 and q is 0, 1, 2 or 3 or

II. an aromatic halide of the formula

wherein Z is halogen, x is 1, 2 or 3 y is 0, 1, 2 or 3 and z is 0, 1, 2 or 3; and wherein each Ar is independently selected from substituted or unsubstituted phenylene, and substituted and unsubstituted polynuclear aromatic moieties activated to electrophilic substitution; in a reaction medium comprising:

(A) a Lewis acid in an amount effective to act as a catalyst for the polymerization; and (B) a relatively non-polar diluent having a dielectric constant less than 2.6;

said polymerization being carried out under conditions such that the poly(arylene ether ketone) produced or its complex with the Lewis acid is suspended in said relatively nonpolar diluent.

16. A method in accordance with claim 15 wherein said diluent is cyclohexane, petroleum ether, heptane, hexane or mixtures thereof.

17. A method in accordance with claim 16 wherein said diluent further comprises methylene chloride, carbon disulfide, o-dichlorobenzene, 1,2,4-trichlorobenzena, o-difluorobenzene, 1,2-dichloroethane, tetrachloroethylene, 1,1,2,2-tetrachloroethane or mixtures thereof.

18. A method in accordance with claim 17 wherein said monomer system comprises an aromatic acid halide of the formula

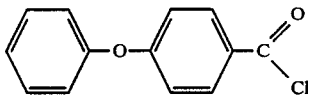

19. A method in accordance with claim 17 wherin said monomer system comprises an aromatic diacid dihalide of the formula

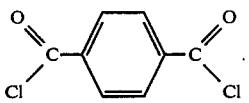

and a polynuclear aromatic comonomer of the formula

20. A block copolymer of the formula

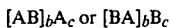

wherein b is 1 to 20; c is 0 or 1, A is a polymeric moiety comprising repeat units derived from a member of the group consisting of 4-chlorostyrene, 3,4-dichlorostyrene or 2,6-dichlorostyrene and B is a polymer moiety comprising repeat units derived from a member of the group consisting of 2-vinylpyridene, 4-vinylpyridine, mathylmethacrylate, acrylonitrile and methacrylonitrile.

* * * * *

UNITED STATES PATENT AND TRADEMARK OFFICE
CERTIFICATE OF CORRECTION

PATENT NO. : 4,698,393

DATED : October 6, 1987

INVENTOR(S) : JANSONS et al

It is certified that error appears in the above-identified patent and that said Letters Patent is hereby corrected as shown below:

In Col. 20, line 50 the formula should read: $(30/70, M_n = 50 \times 10^5)$.

In Col. 21, line 31, 0..050g should read 0.050g.

In Col. 22, line 5, an should be "and".

In Col. 24, line 50, the formula should read:

In Col. 25, line 25, before -bromostyrene should be a "4".

In Col. 25, line 27, before -vinylpyridine should be a "2".

In Col. 26, line 59, after which, delete "polymerizing a monomer system".

In Col. 28, line 34, correct mathylmethacrylate to read methylmethacrylate.

Signed and Sealed this

Twelfth Day of June, 1990

Attest:

HARRY F. MANBECK, JR.

Attesting Officer

Commissioner of Patents and Trademarks